Oct. 28, 1969  R. A. BRUDI ET AL  3,474,985
DUAL SLACK TAKE-UP REEL UNIT FOR A PAIR OF HOSE LINES OR CABLES
Filed Jan. 22, 1968  2 Sheets-Sheet 1
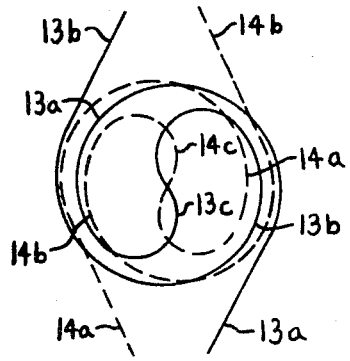
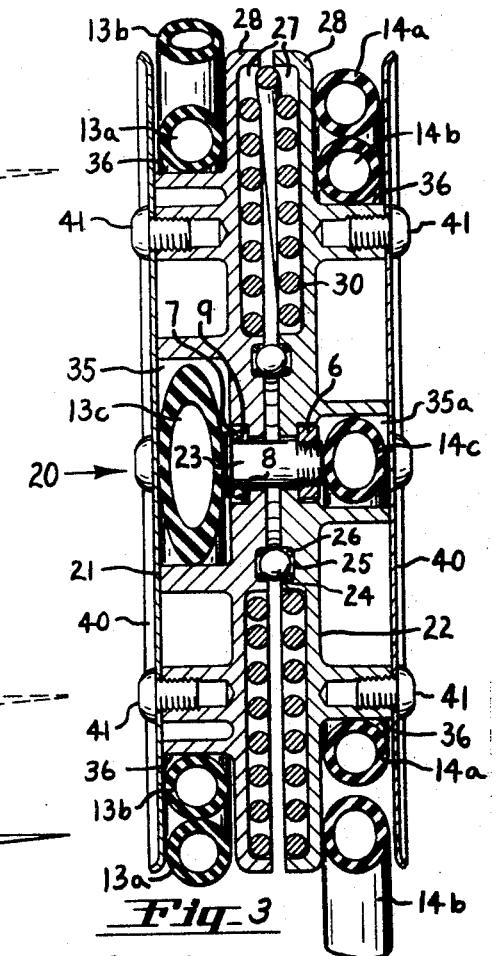
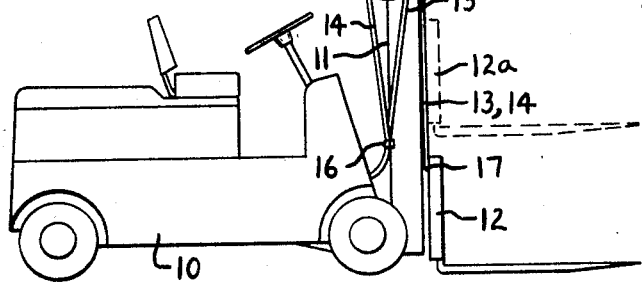
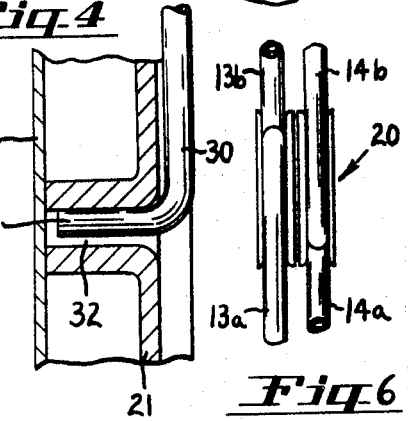
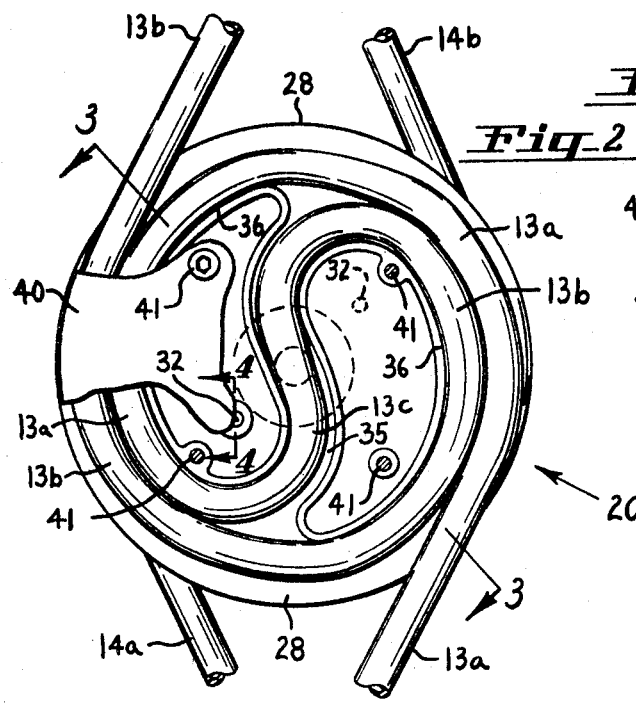
INVENTORS
RONALD A. BRUDI
THEODORE L. CROMER
BY
*Attorney*

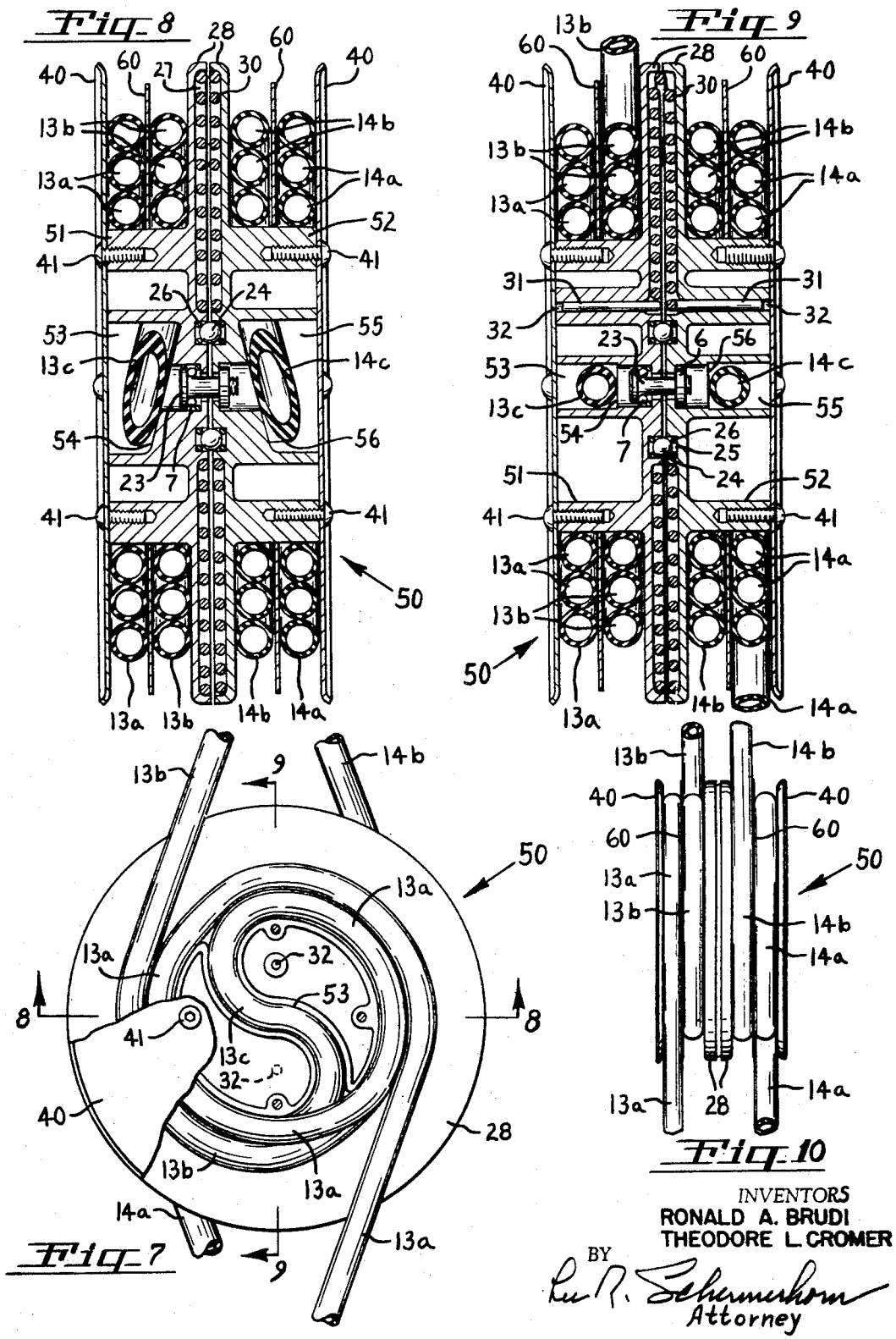

3,474,985
DUAL SLACK TAKE-UP REEL UNIT FOR A PAIR OF HOSE LINES OR CABLES
Ronald A. Brudi, Longview, Wash., and Theodore L. Cromer, Lake Oswego, Oreg., assignors to Brudi Equipment, Inc., Longview, Wash., a corporation of Washington
Filed Jan. 22, 1968, Ser. No. 699,615
Int. Cl. B65h 75/48, 75/38; B66f 9/08
U.S. Cl. 242—107.11                    13 Claims

ABSTRACT OF THE DISCLOSURE

Two reels are pivotally connected together and tensioned to rotate in opposite directions by a pancake-type coil spring between the reels, two hoses being wound in opposite directions on the two reels. The reel unit floats on the hose lines intermediate their ends and has no other support and no fluid connections with the hose lines.

BACKGROUND OF THE INVENTION

This invention relates to take-up reels for a pair of hose lines or cables and has particular reference to hose reels for hydraulic lines on lift trucks.

It is common practice to build industrial lift trucks with double extension or triple extension masts in order to impart a high lift to the load carriage. It is also common practice to equip the load carriage with various hydraulically operated devices such as a clamp to grip the load, a lateral shift mechanism to move the carriage laterally on the mast or a rotator for upending the load. Such hydraulic devices require pressure and relief lines connected with a hydraulic pump and control valve on the truck, these lines being trained over the mast. In the case of double or triple extension masts, the hose lines must be adapted to vary in length in certain ranges of the lift movement of the carriage Heretofore, it has been the practice to mount hose take-up reels on the truck to accommodate such variations in length. The take-up reels have not only been an item of considerable cost but, also, a source of trouble, particularly from leakage in the high pressure rotative connections with the ends of the hoses. The reels were mounted in stationary position on the truck and provided anchorage as well as fluid connections for the hoses. It is desirable to provide take-up reels which are less expensive to manufacture and more trouble free.

SUMMARY OF THE INVENTION

According to the present invention, the hose reels are not mounted in fixed position on the truck but are supported by the hose lines themselves. Intermediate portions of the hoses pass through the reels without any fluid connections in the reels. The hoses are connected at one end to the truck and at the other end to the load carriage whereby rotative fluid connections in the reel are eliminated.

Separate reels for the two hoses are pivotally connected together and tensioned to rotate in opposite directions by a pancake-type torsional spring between the reels. The hoses are wound in opposite directions on the respective reels in such manner that the single spring is effective to wind or unwind both reels simultaneously.

Objects of the invention are to provide improved take-up reels for a pair of hose lines or cables, to provide take-up reels which do not require fluid connections with hose lines or electrical connections with conductor cables, to provide a take-up reel unit which is bodily supported by its hose lines or cables, to provide an improved take-up reel unit for the hydraulic lines on lift trucks and to provide a take-up reel unit which is economical to manufacture and trouble free in operation.

The invention will be better understood and the foregoing and other objects and advantages will become apparent from the following description of the preferred embodiments illustrated in the accompanying drawings. While the invention is illustrated in connection with a lift truck by way of example, it is to be understood that the invention is of general application and is not limited to any particular use.

BRIEF DESCRIPTION OF THE DRAWINGS

FIGURE 1 is a side elevation view of a lift truck, showing a take-up reel unit embodying the features of the invention;

FIGURE 2 is an enlarged elevation view of a first embodiment of reel unit with one cover plate broken away;

FIGURE 3 is an enlarged view on the line 3—3 in FIGURE 2;

FIGURE 4 is an enlarged view on the line 4—4 in FIGURE 2;

FIGURE 5 is a diagrammatic view illustrating the winding of the two hose lines on the reels in FIGURE 2;

FIGURE 6 is an elevation view of the reel unit at right angles to FIGURE 2;

FIGURE 7 is a view similar to FIGURE 2 showing a modification;

FIGURE 8 is an enlarged view on the line 8—8 in FIGURE 7;

FIGURE 9 is an enlarged view on the line 9—9 in FIGURE 7; and

FIGURE 10 is an elevation view at right angles to FIGURE 7.

DESCRIPTION OF THE PREFERRED EMBODIMENTS

FIGURE 1 shows a conventional type of lift truck 10 having, by way of example, a triple extension mast 11 and a load carriage 12. The load carriage has a certain amount of free rise on the mast as indicated at 12a before the mast itself starts to rise. Then, by raising the mast, the load carriage may be lifted still higher as indicated at 12b. Such load carriages are commonly equipped with a hydraulic device, not shown, for clamping a load, rotating the carriage or shifting the carriage laterally. Pressure and relief hose lines 13 and 14 are trained over sheaves 15 on the upper end of the mast to operate the hydraulic mechanism on the carriage 12.

One end of the hose lines 13 and 14 is anchored to the truck at 16 and the other end is anchored to the carriage at 17. At anchor point 16 the hose lines are connected to conventional hydraulic pump and valve mechanisms (not shown) on the truck. During the free rise movement of tthe carriage from its position at 12 to its position at 12a, the hose lines become shorter. During part of the rise of the carriage from position 12a to its uppermost position at 12b, the hose lines may not vary appreciably in length but, with a triple extension mast, the hose lines require additional length near the upper limit of movement of the carriage. Whenever there is a variation in length of the hose lines, means must be provided to take up the excess length. This is the function of take-up reel unit 20.

Reel unit 20 comprises two reels 21 and 22 which may be identical and cast in a common mold. These reels are connected together for relative rotation by an axial pin 23 and nut 6. Anti-friction balls 7 are confined in annular recess 8 by the head of pin 23 and a wire ring 9 may be included to form a raceway for the balls. The reels are held slightly separated by anti-friction balls 24 in complementary annular grooves 25 in the two reels. Preferably, these grooves are equipped with four wire rings 26 which form ball races in the grooves.

Mating annular recesses 27 surrounding the ball grooves 25 form a two part spring housing 28 for torsional spring 30. This is a pancake-type of spring wound in two layers with its ends at the centers of the two coils. The two ends 31 are outturned axially in opposite directions to hook into spring anchor holes 32 in the two reels as shown in FIGURE 4 for the reel 21.

Each reel has an S-shaped diametral hose passageway 35 through its center on opposite sides of which is a pair of arcuate hose supporting surfaces 36. Surfaces 36 form the spool or drum on which the hose is wound in a radial plane. The hose is confined in the radial plane by a cover plate 40 on each reel secured by four screws 41 or other suitable means.

It will be apparent that in assembling the two identical or similar reel castings 21 and 22 back to back on the pin 23, the S-shaped passageways 35 will be reversed with respect to each other. Thus, in FIGURE 2, the passageway 35 in reel 21 is in normal S shape while the corresponding passageway in the other reel 22 would be in the shape of a reversed S if it could be seen in this view. This is illustrated diagrammatically in FIGURE 5 where the hose 13 is shown as a solid line and the hose 14 is shown as a broken line, the two lines being slightly offset from each other so that the solid line will not fall on top of the broken line. Portion 13c of hose 13 assumes a normal S shape while portion 14c of hose 14 assumes a reversed S shape.

The hoses are threaded into the two reels with the cover plates 40 removed. The lower reach of hose 13 approaches the right side of reel 21 at 13a in a counterclockwise direction of wrap, passes through S-shaped passageway 35 at 13c and leaves the reel in a clockwise direction of wrap on the upper left side at 13b. Hose 14 approaches reel 22 on the lower left side at 14a in a clockwise direction of wrap, passes through the reverse S-shaped passageway 35a at 14c and leaves the reel on the upper right side in a counterclockwise direction of wrap at 14b, as viewed in FIGURES 2 and 5.

On the right side of the reels in FIGURES 2 and 5, portion 13a wraps on top of portion 13b and portion 14b wraps on top of portion 14a. On the left side of the reels, portion 13b wraps on top of portion 13a and portion 14a wraps on top of portion 14b.

By cutting the hoses to the proper lengths and wrapping a length of each end portion 13a, 13b, 14a and 14b on the reels in installation as shown in FIGURE 2, the hoses will be drawn out of the reels to some extent in securing the ends at the anchorage points 16 and 17, thereby tensioning the spring 30. Drawing out the hoses rotates reel 21 clockwise and reel 22 counterclockwise. The action of spring 30 in winding in the hoses rotates reel 21 counterclockwise and reel 22 clockwise.

When the movement of carriage 12 requires lengthening of the hose, equal lengths of hose are pulled out of the upper and lower sides of both reels, causing them to rotate in opposite directions against spring tension and moving reel unit 20 upward, away from anchor point 16, as indicated at 20b in FIGURE 1. When the movement of carriage 12 reduces the required length of hoses, spring 30 rotates the two reels reversely in opposite directions, winding in equal lengths of hose at the top and bottom of both reels, causing reel unit 20 to descend closer to anchor point 16.

Thus, reel unit 20 floats on the hose lines and is always in stable, balanced position exerting uniform tension on both lines. The balanced condition of the reel unit is illustrated in FIGURE 6 wherein it is seen that the upwardly extending hose portion 13b is in the vertical plane of downwardly extending hose portion 13a and the upwardly extending hose portion 14b is in the vertical plane of downwardly extending hose portion 13a. This balance of upwardly and downwardly acting forces prevents tilting or twisting of the reel axis.

There is no stationary external housing or casing for the reels. The S-shaped passageways 35 and 35a frictionally grip the portions of the hoses engaged therein to prevent slippage of the hoses in the reels. Since the hoses are continuous through the reel unit, there are no rotative fluid connections to leak or otherwise give trouble. The reel unit may also be used for taking up slack in a pair of electrical conductors, without any electrical connections in the reels. It may also be used on a pair of ropes or cables. The reference to hoses in the specification and claims is not intended to limit the application of the invention.

FIGURES 7 to 10 show a modification having greater hose capacity for a given diameter of reel. This reel unit 50 is generally similar to the reel unit 20 and corresponding parts are identified by the same reference numerals. In unit 50 each hose is wound in two radial coils instead of a single coil. Thus, the reels 51 and 52 are twice as wide in an axial direction as the reels 21 and 22 in FIGURE 3.

The downwardly extending hose portion 13a is wound in one radial coil and the upwardly extending hose portion 13b is wound in a second radial coil in the reel 51. Similarly, the downwardly extending portion 14a is wound in one radial coil and the upwardly extending hose portion 14b is wound in another radial coil in the reel 52. The portions 13a and 13b do not wrap on top of each other and the portions 14a and 14b do not wrap on top of each other as in the first embodiment.

In order to effect this wrapping pattern, the S-shaped passageway 53 in reel 51 has a sloping side wall 54 which slopes throughout the length of the passageway to incline the gripped portion 13c of hose 13 from one side of the reel to the other. Similarly, the reverse S-shaped passageway 55 in reel 52 has a sloping side wall 56 to guide the gripped portion 14c of hose 14 from one side of the reel to the other side. When the hoses are placed in the passageways 53 and 55, they are crowded against the inclined side walls 54 and 56 so as to be properly positioned thereby. Thus, as hose is wound on the reels, successive turns of end portion 13a wind on top of each other, successive turns of end portion 13b wind on top of each other, successive turns of end portion 14a wind on top of each other and successive turns of end portion 14b wind on top of each other.

In order to balance the vertical forces acting on the reel so that the reel axis will not tend to tilt or twist, the wall surfaces 54 and 56 slope in opposite axial directions so as to place the two lower end portions 13a and 14a in corresponding positions in the two reels and to place the two upper end portions 13b and 14b in corresponding positions in the two reels as shown in FIGURE 10. The lower end portions 13a and 14a are wound in coils adjacent the cover plates 40 and the upper end portions 13b and 14b are wound in coils adjacent the spring housing parts 28.

This arrangement balances the reel unit in stable position even though the lower and upper portions 13a and 13b are not in a common vertical plane and the lower and upper portions 14a and 14b are not in a common vertical plane. Portions 13a and 14a are equally spaced on opposite sides of the medial radial plane of the unit 50 and portions 13b and 14b are also equally spaced on opposite sides of the medial plane whereby the resultant downward force and the resultant upward force both remain in the medial radial plane of the reel unit. Alternatively, the lower end portions may be wound adjacent the spring housing parts 28 and the upper portions may be wound adjacent the cover plates 40 without disturbing the desired balance of external forces on the reel unit.

FIGURES 8 and 9 show more turns of the hoses on the reels than in FIGURE 7. A pair of annular flat discs 60 may be inserted, if necessary, to separate the adjacent radial coils 13a and 13b in reel 51 and the adjacent radial coils 14a and 14b in reel 52 and cause the coils to wind side by side in orderly manner. These discs are assembled loosely in the reels during the initial placement of the hoses in the reels. The discs are omitted in FIGURE 7 in order to show more clearly the convolutions of the hoses.

Having now described our invention and in what manner the same may be used, what we claim as new and desire to protect by Letters Patent is:

1. A reel unit for a pair of hose lines and the like, comprising a pair of reels pivotally connected together for relative rotation about a common axis, a torsional spring connected between the reels for rotating them in opposite directions, and a diametral hose passageway through the center of each reel for medially gripping one of the hose lines, whereby rotation of said reels by said spring causes end portions of the hose lines to be wound on the reels, said unit being adapted to be supported by the hose lines.

2. A unit as defined in claim 1, each reel being arranged to wind its hose in a radial plane.

3. A unit as defined in claim 1, said two reels being identical with each other.

4. A unit as defined in claim 1 including removable cover plates for retaining said hoses in said diametral passageways.

5. A unit as defined in claim 1, said diametral passageways being of S shape in reversed relation.

6. A unit as defined in claim 1, said reels having confronting annular recesses forming a spring housing for said spring.

7. A unit as defined in claim 1, said spring being a pancake-type spring with outturned ends extending in opposite axial directions, said reels having spring anchor holes for said spring ends.

8. A unit as defined in claim 1 including an axial pin interconnecting said reels.

9. A unit as defined in claim 8, said reels having confronting annular grooves surrounding said axial pin, and anti-friction balls in said grooves.

10. A unit as defined in claim 9 including wire rings in said grooves forming ball races for said balls.

11. A unit as defined in claim 1, each reel being arranged to wind one end portion of its hose in a first radial plane and the opposite end portion in a second radial plane.

12. A unit as defined in claim 11, said hose passageway through the center of each reel having an inclined side wall to position said end portions of each hose in said different radial planes.

13. A unit as defined in claim 12, corresponding end portions of the two hoses on one side of the reel unit axis being at equal distances on opposite sides of the medial radial plane of the unit and corresponding end portions of the two hoses on the opposite side of said axis being at equal distances on opposite sides of said medial plane so that said unit is supported in stable position by the two hoses.

References Cited

UNITED STATES PATENTS

| 1,663,083 | 3/1928 | Kavle | 242—107.1 |
| 2,052,341 | 8/1936 | Douglass | 242—107.11 |
| 2,742,242 | 4/1956 | Godwin | 242—86.1 |
| 3,289,870 | 12/1966 | Quayle | 214—672 |

FOREIGN PATENTS 91,777   5/1897   Germany.

MERVIN STEIN, Primary Examiner

WERNER H. SCHROEDER, Assistant Examiner

U.S. Cl. X.R.

214—672; 242—86.1